United States Patent
Yoon et al.

(10) Patent No.: US 9,449,522 B2
(45) Date of Patent: Sep. 20, 2016

(54) SYSTEMS AND METHODS FOR EVALUATING DIFFICULTY OF SPOKEN TEXT

(71) Applicant: Educational Testing Service, Princeton, NJ (US)

(72) Inventors: Su-Youn Yoon, Lawrenceville, NJ (US); Yeonsuk Cho, Princeton, NJ (US); Klaus Zechner, Princeton, NJ (US); Diane Napolitano, Highland Park, NJ (US)

(73) Assignee: Educational Testing Service, Princeton, NJ (US)

(*) Notice: Subject to any disclaimer, the term of this patent is extended or adjusted under 35 U.S.C. 154(b) by 255 days.

(21) Appl. No.: 14/080,867

(22) Filed: Nov. 15, 2013

(65) Prior Publication Data

US 2014/0141392 A1  May 22, 2014

Related U.S. Application Data

(60) Provisional application No. 61/727,276, filed on Nov. 16, 2012.

(51) Int. Cl.
| | | |
|---|---|---|
| G06F 17/27 | (2006.01) | |
| G06F 17/21 | (2006.01) | |
| G10L 15/00 | (2013.01) | |
| G09B 5/04 | (2006.01) | |

(52) U.S. Cl.
CPC ..................................... *G09B 5/04* (2013.01)

(58) Field of Classification Search
None
See application file for complete search history.

(56) References Cited

U.S. PATENT DOCUMENTS

| | | | | |
|---|---|---|---|---|
| 6,029,124 A * | 2/2000 | Gillick | ............. | G10L 15/08 704/200 |
| 6,292,778 B1 * | 9/2001 | Sukkar | ............. | G10L 15/08 704/249 |
| 6,953,343 B2 * | 10/2005 | Townshend | ............. | G09B 7/04 434/178 |
| 7,062,441 B1 * | 6/2006 | Townshend | ............. | G09B 19/04 434/353 |
| 7,840,404 B2 * | 11/2010 | Xi | ............. | G10L 15/26 704/243 |
| 8,041,561 B2 * | 10/2011 | Deligne | ............. | G10L 15/20 704/224 |
| 8,147,265 B2 | 4/2012 | Chiu | | |
| 8,239,203 B2 * | 8/2012 | Stubley | ............. | G10L 15/08 704/235 |
| 8,457,967 B2 * | 6/2013 | Audhkhasi | ............. | G09B 19/04 704/10 |
| 9,177,558 B2 * | 11/2015 | Chen | ............. | G09B 7/02 |
| 2005/0182628 A1 * | 8/2005 | Choi | ............. | G10L 15/08 704/252 |
| 2010/0145698 A1 * | 6/2010 | Chen | ............. | G09B 7/02 704/256.1 |
| 2011/0099012 A1 * | 4/2011 | Williams | ............. | G10L 15/01 704/240 |
| 2013/0262097 A1 * | 10/2013 | Ivanou | ............. | G10L 19/0212 704/204 |

* cited by examiner

*Primary Examiner* — Satwant Singh
(74) *Attorney, Agent, or Firm* — Jones Day

(57) ABSTRACT

Systems and methods are provided for assigning a difficulty score to a speech sample. Speech recognition is performed on a digitized version of the speech sample using an acoustic model to generate word hypotheses for the speech sample. Time alignment is performed between the speech sample and the word hypotheses to associate the word hypotheses with corresponding sounds of the speech sample. A first difficulty measure is determined based on the word hypotheses, and a second difficulty measure is determined based on acoustic features of the speech sample. A difficulty score for the speech sample is generated based on the first difficulty measure and the second difficulty measure.

22 Claims, 7 Drawing Sheets

| Method | Construct | Features |
|---|---|---|
| Second Difficulty Measure | fluency | wpsec |
| Second Difficulty Measure | fluency | longpfreq |
| Second Difficulty Measure | fluency | wdpchkmeandev |
| Second Difficulty Measure | prosody | stretimemean |
| Second Difficulty Measure | pronunciation | phn_shift |
| First Difficulty Measure | vocabulary | nouncollocationspersent |
| First Difficulty Measure | grammar | avg_sent_wrd_cnt |
| First Difficulty Measure | grammar | long_sentences |
| First Difficulty Measure | grammar | sent_per_1000words |
| First Difficulty Measure | vocabulary | type_token_ratio |
| First Difficulty Measure | vocabulary | voc40_and_wds_not_tasa |
| First Difficulty Measure | vocabulary | listenability_biber_type |

FIG. 3

SYSTEMS AND METHODS FOR EVALUATING DIFFICULTY OF SPOKEN TEXT

CROSS-REFERENCE TO RELATED APPLICATIONS

The present application claims priority from U.S. Provisional Application Ser. No. 61/727,276 entitled "An Automated Spoken Text Difficulty Evaluation Method," filed 16 Nov. 2012, the entirety of which is hereby incorporated by reference.

FIELD

This disclosure is related generally to audio processing and more particularly to spoken text difficulty estimation.

BACKGROUND

The use of audio in teaching and examination can be highly beneficial. For example, the use of audio of a person speaking can be useful in determining an examinee's level of comprehension. Audio listening items can also be useful in helping a student improve certain skills such as language learning. The benefit of such audio of speech samples can be significantly diminished when the difficulty of the speech sample in the audio is substantially mismatched with a listener's ability level (e.g., a novice language learner may struggle to understand a native, fast-talking speaker of an unfamiliar language).

SUMMARY

Systems and methods are provided for assigning a difficulty score to a speech sample. Speech recognition is performed on a digitized version of the speech sample using an acoustic model to generate word hypotheses for the speech sample. Time alignment is performed between the speech sample and the word hypotheses to associate the word hypotheses with corresponding sounds of the speech sample. A first difficulty measure is determined based on the word hypotheses, and a second difficulty measure is determined based on acoustic features of the speech sample. A difficulty score for the speech sample is generated based on the first difficulty measure and the second difficulty measure.

As another example, a computer-implemented system for assigning a difficulty score to a speech sample includes a computer-readable medium configured to store a digitized version of a speech sample. An automatic speech recognizer is configured to perform speech recognition on the digitized version of the speech sample using an acoustic model to generate word hypotheses for the speech sample and to perform time alignment between the speech sample and the word hypotheses to associate the word hypotheses with corresponding sounds of the speech sample. A textual difficulty determination engine is configured to determine a first difficulty measure based on the word hypotheses for the speech sample. An acoustic difficulty determination engine is configured to determine a second difficulty measure based on acoustic features of the speech sample. A difficulty score calculator is configured to generate a difficulty score for the speech sample based on the first difficulty measure and the second difficulty measure, and a computer-readable medium is configured to store the difficulty score.

BRIEF DESCRIPTION OF THE DRAWINGS

FIG. 3 is a table depicting twelve example difficulty measures.

DETAILED DESCRIPTION

Figure 1:
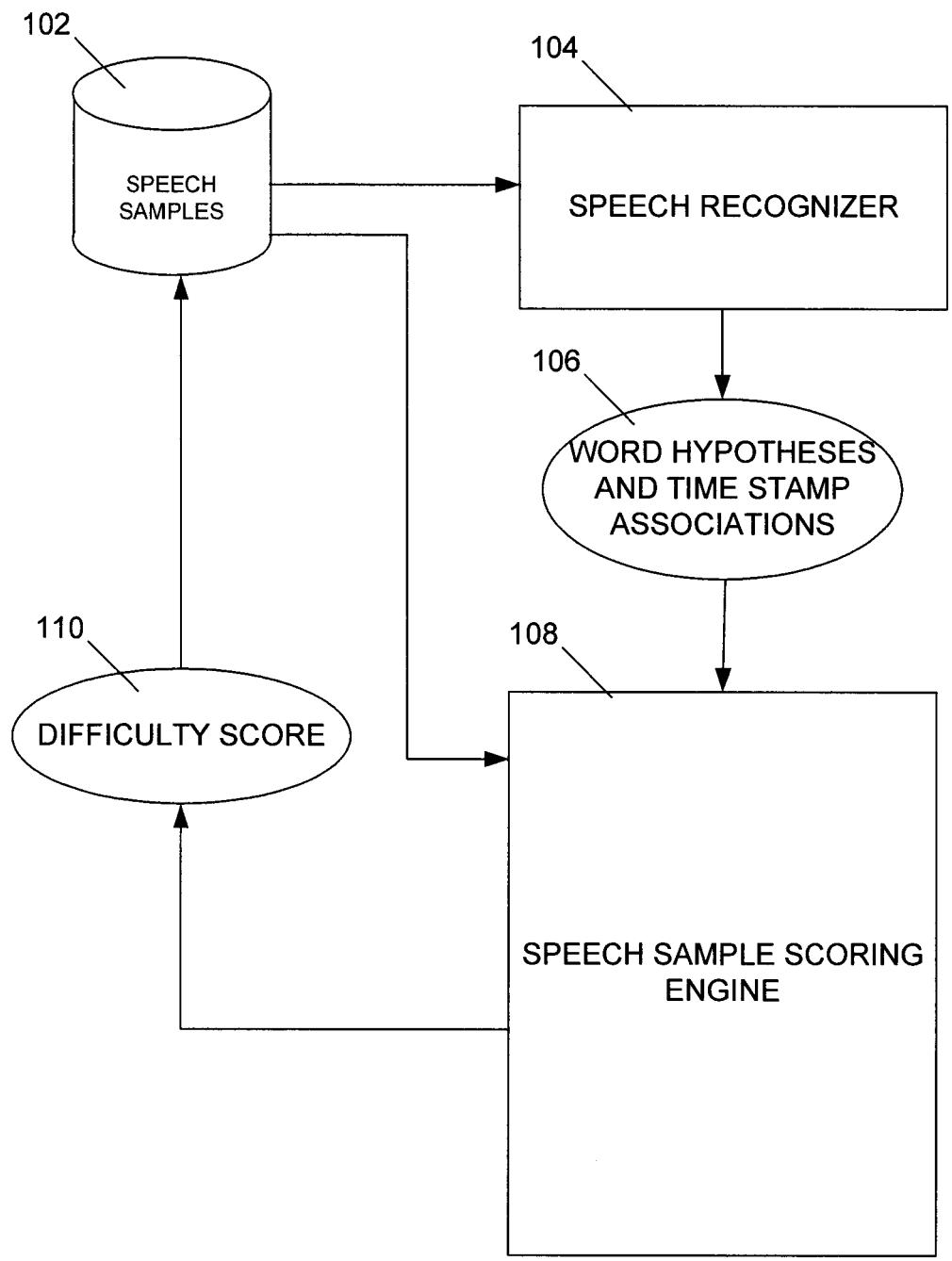
FIG. 1 is a block diagram depicting a computer-implemented system for assigning a difficulty score to a speech sample.

FIG. 1 is a block diagram depicting a computer-implemented system for assigning a difficulty score to a speech sample. A computer-readable medium 102 stores a repository of speech samples for evaluation. Such speech samples can come from a variety of sources, such as speech samples that are specifically recorded for use with a system or real life speech samples, such as a recording of a news broadcast. A speech sample 102 is provided from the repository to a speech recognizer 104 for analysis. The speech recognizer 104, such as an automatic speech recognizer that includes a trained acoustic model or a human transcriber, identifies word hypotheses of words that are thought to be present in the speech sample. The speech recognizer 104 further performs a time alignment between the speech sample 102 and the word hypotheses to associate the word hypotheses with corresponding sounds (phonemes) of the speech sample (e.g., the word "dragon" is used at 0:30.45-0:30.90 of the speech sample). The word hypotheses and time stamp associations 106 are provided to a speech sample scoring engine 108 for further processing and generation of a difficulty score 110 for the speech sample 102. The difficulty score 110 is provided to the repository that stores the speech sample 102 or another computer-readable storage medium for storage and subsequent access.

Figure 2:
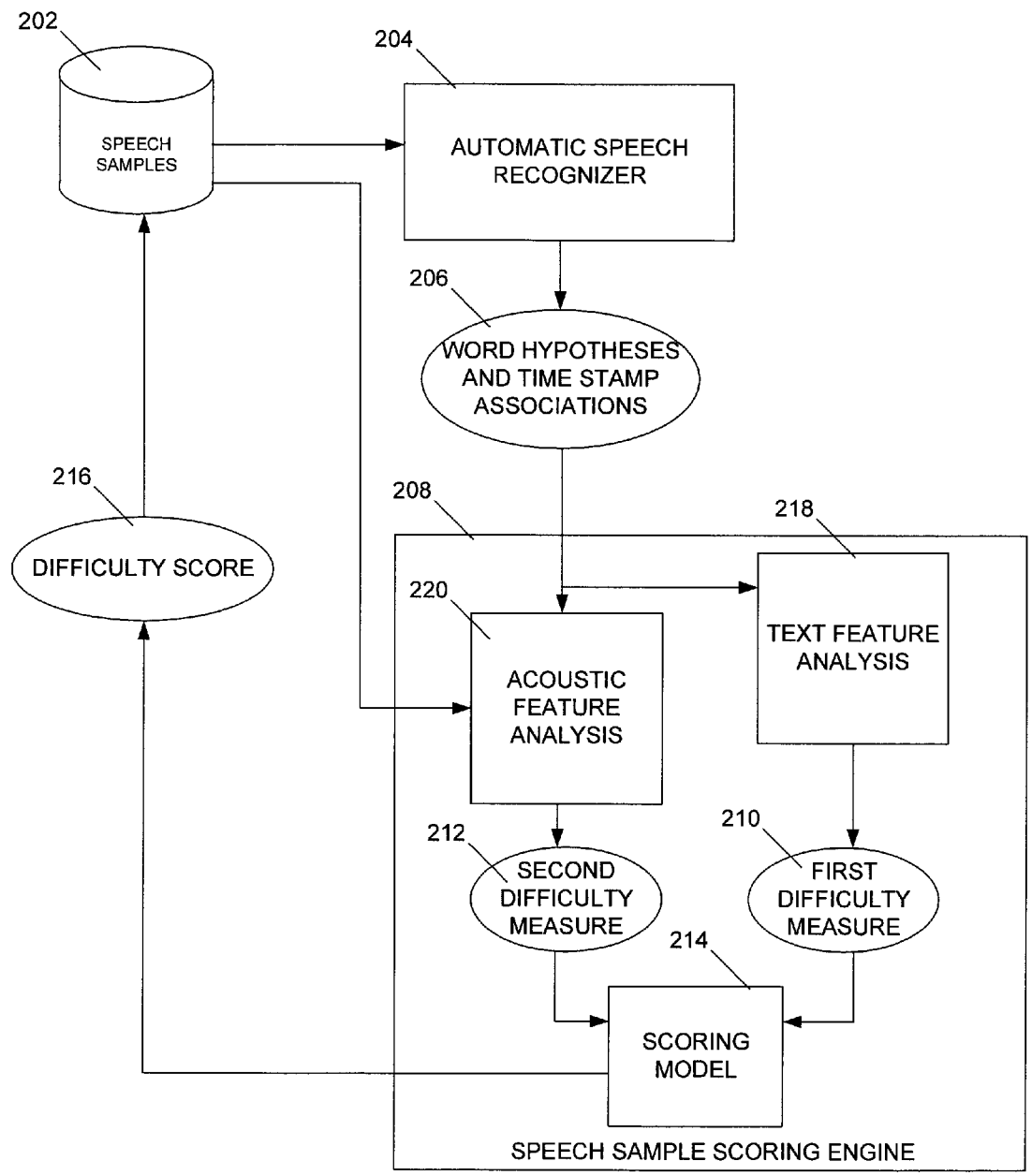
FIG. 2 is a block diagram depicting generation of a difficulty measure.

FIG. 2 is a block diagram depicting generation of a difficulty measure. A speech sample 202 is accessed and provided to an automatic speech recognizer 204 that generates word hypotheses for the speech sample 202 and time stamp associations for those word hypotheses that are output 206 to a speech sample scoring engine 208. The speech sample scoring engine 208 generates a plurality of difficulty measures 210, 212 that are provided to a scoring model 214 for generation of a difficulty score 216 that is associated with a speech sample 202 under consideration.

The plurality of difficulty measures 210, 212 may be determined based on a variety of characteristics of the speech sample 202 under consideration. Certain difficulty measures are based on the content of the speech sample (i.e., the words that are present or thought to be present in the speech sample as represented in the transcript of word hypotheses 206). Text feature analysis is performed at 218 to determine a first difficulty measure 210 based on the word hypotheses 206 for the speech sample 202. For example, in one embodiment, the first difficulty measure 210 represents the difficulty of vocabulary used in the speech sample 202, where the word hypotheses are compared to a vocabulary difficulty repository that identifies a difficulty associated with each word. A total vocabulary difficulty (e.g., an average difficulty) is output by the text feature analysis 218 for use by the scoring model 214.

As another example, certain difficulty measures may be based on pure acoustic characteristics of the speech sample. A speech sample 202 is provided to the speech sample scoring engine 208 for acoustic feature analysis at 220 for determination of a second difficulty measure 212. In one example, a pure acoustic characteristic is determined by analyzing a number of pauses in the speech sample 202 to determine fluency difficulty measures such as silences per unit time or silences per word. Such a second difficulty measure 212 is provided to the scoring model 214 for generation of a difficulty score 216 representative of the difficulty of the speech sample.

In a further example, certain difficulty measures are based on both acoustic and textual characteristics of the speech sample. For example, a pronunciation difficulty measure measures a correctness of pronunciation of words in the speech sample. For each word hypothesis 206 provided to the speech sample scoring engine 208, a proper pronunciation(s) is accessed from a dictionary repository. That cannonical pronunciation is compared to an actual pronunciation exhibited in the speech sample 202 at 220 to determine a quality of pronunciation in the speech sample, which is output from the acoustic feature analysis 220 to the scoring model 214 as the second difficulty measure 212.

The scoring model 214 receives one or more difficulty measures 210, 212 and generates a difficulty score for the speech sample 202 based on the received difficulty measures 210, 212. In one example, a number of difficulty measures are analyzed using linear regression to identify a correlation between those difficulty measures and speech sample difficulty (e.g., difficulty measured by a human scorer). A subset of difficulty measures which correlate significantly to the speech sample difficulty are selected, and a weighted average of those selected difficulty measures 210, 212 is used to generate a difficulty score 216 for speech samples 202.

A speech sample scoring engine can be configured to utilize a variety of difficulty measures in generating a difficulty score for a speech sample. FIG. 3 is a table depicting twelve example difficulty measures. The table includes a wpsec measure that identifies the number of words spoken per second in a speech sample; a longpfreq metric that identifies a number of long silences per word (e.g., greater than 0.495 seconds); a wdpchkmeandev metric that identifies an average chunk length in words, where a chunk is a segment whose boundaries are set by silences or disfluencies over a threshold length (e.g., 0.2 seconds); a stretimemean measure that identifies a mean distance between stressed syllables in seconds; a phn_shift metric that identifies the mean of absolute difference between the normalized vowel durations compared to standard normalized vowel durations estimated on a native speech corpus; a nouncollocationspersent metric that identifies a number of noun collocations per clause; a type_token_ratio metric that identifies a number of types divided by a number of tokens; a voc40_and_wds_not_tasa metric that identifies a normalized count of word types whose TASA SFI<40 or words which are not found in TASA; a listenability_biber_type metric that identifies the average frequency of word types in the response; an avg_sent_wrd_cnt grammar measure that identifies an average number of words in a sentence; a long_sentences metric that identifies the number of sentences that contain more than 25 words; a sent_per_1000words grammar metric that measures a number of sentences per 1000 words in the speech sample; as well as others. Other measures include, a number of silences per word measure, a decoding difficulty measure that identifies an average phonetic similarity with other words, a weighted decoding difficulty measure that identifies decoding difficulty weighted by frequency of words, a mean pronunciation variation measure that identifies an average number of pronunciation variations per word, a multiple pronunciation per word measure that identifies the proportion of words that contain multiple pronunciation variations, a connected word per words measure that identifies the proportion of word sequences that are frequently pronounced as connected words, a co-articulated syllable measure that identifies a proportion of co-articulated syllable pairs to the total number of syllables per word, a weak preposition per words measure that identifies the proportion of prepositions used in weak form over the total number of words, a complicated syllables measure that identifies the proportion of complicated syllables over the total number of syllables, a word start with weak syllable measure that identifies the proportion of words starting with weak syllables (e.g., "assist") over the total number of words, a median word frequency measure based on a spoken language corpus, a low frequency words measure that identifies the number of unique words that appear rarely in spoken language as identified by a corpus, an idioms per clause metric, a phrasal verb per clause measure, a noun collocation per clause measure, a mean clause length measure, a number of long sentences measure, a number of homophones measure, a phonetic neighbor density metric that identifies the number of neighbors where neighbor is defined as a word that differs only in on phoneme, and a frequency weighted phonetic neighbor density measure. Certain of the measures are pure acoustic based (wpsec) or pure text based (sent_per_1000words), while others are both acoustic and text based (phn_shift).

Upon selection of a collection of measures to be used, a scoring model is calibrated to weight those measures accordingly. For example, a high speaking rate measure (wpsec) may be positively weighted based on a positive correlation with speech sample difficulty (faster speakers are harder to understand), while a sentence length measure (sent_per_1000words) may be negatively weighted based on a negative correlation with speech sample difficulty (shorter sentences are easier to understand).

In addition to analyzing the difficulty of a speech sample that includes speech of a single user, a speech sample scoring engine can be configured to analyze certain measures related to discourse between multiple persons. For example, a speech sample may include a conversation between a man and a woman. The automatic speech recognizer or the speech sample scoring engine is configured to identify which portions of the speech sample are associated with which speaker. Certain measures may be determined based on the characteristics of the individual speaker. For example, certain pronunciation and prosody measures are determined for each speaker for consideration by the scoring model. Additionally, certain measures may be extracted based on the interaction between the two speakers. For example, metrics may be determined that measure dialog characteristics of the communication between the two speakers. Such dialog characteristics are converted into measures that are considered by the scoring model in generating a difficulty score for the scoring sample.

Figure 4:
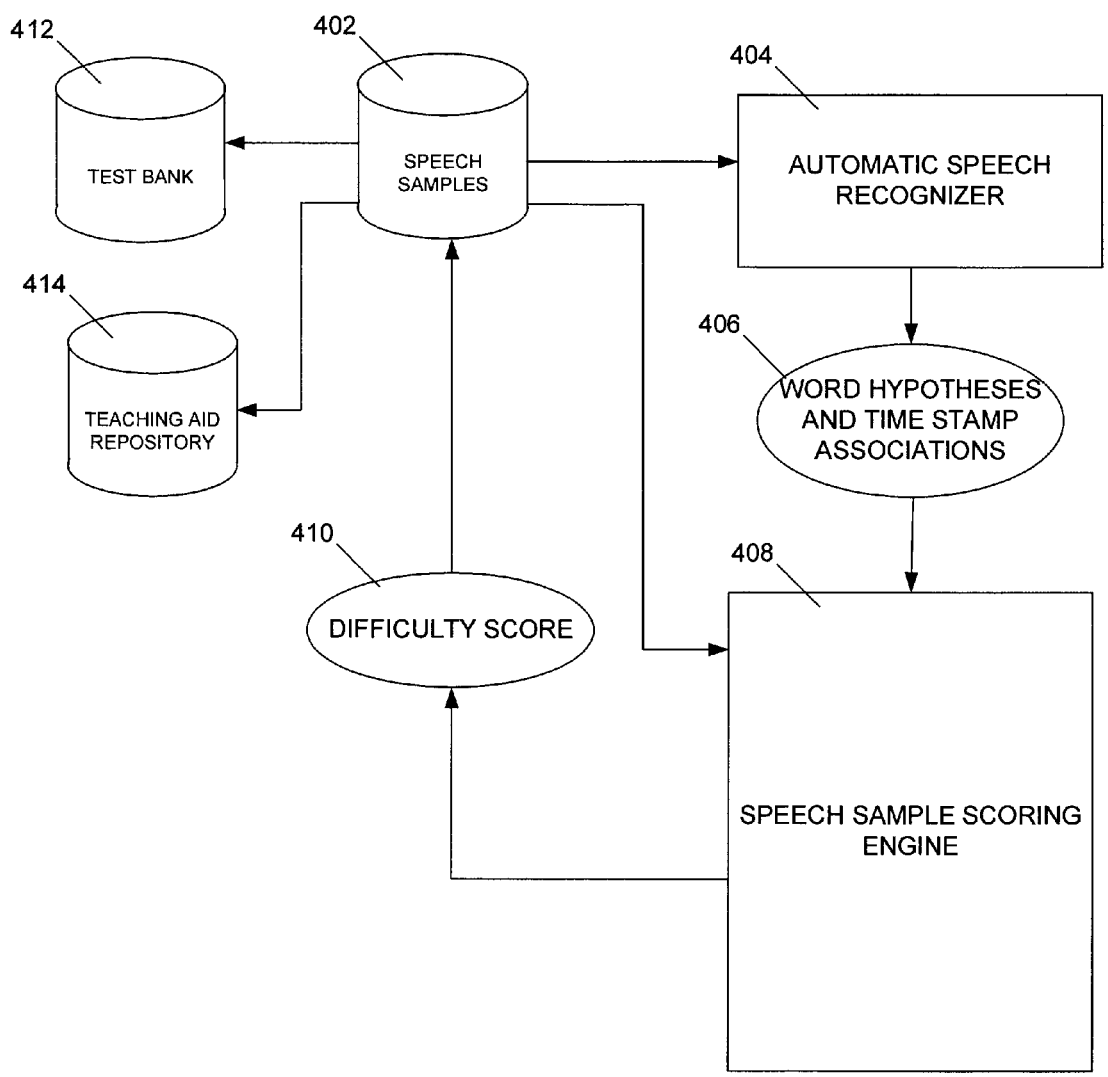
FIG. 4 is a block diagram depicting example contexts for usage of a difficulty score.

Difficulty scores associated with speech samples may be utilized in a variety of contexts. FIG. 4 is a block diagram depicting example contexts for usage of a difficulty score. A speech sample 402 is provided to an automatic speech recognizer 404 for determination of word hypotheses and time stamp associations 406. Those recognizer outputs 406 are utilized by a speech sample scoring engine 408 in conjunction with the speech sample 402 to generate a difficulty score 410 for the speech sample 402. The difficulty score associated with the speech sample 202 is used to place the speech sample into appropriate data stores for subsequent use.

For example, the speech sample 402 may be a studio recording of a text read aloud by a native English speaker. The speech sample 402 is generated for use as a teaching aid and for use as part of an item on an examination. The speech sample 402 is provided to an automatic speech recognizer having an acoustic model trained on native English speakers to generate word hypotheses, time stamp associations, and other acoustic measures 406. The difficulty score 410 associated with the speech sample 402 is used to appropriately classify the speech sample for an appropriate learning audience. For example, the difficulty score 410 may represent a grade level for which the speech sample 402 is expected to be understandable but challenging. Based on the difficulty score 410, the speech sample 402 can be put in an appropriate test bank 412 for use in examinations for students of the identified grade level. Additionally, the speech sample 402 can be put in a teaching aid repository 414 for use in practice items for students of the identified grade level.

In another example, the speech sample 402 is being analyzed for appropriateness for use in testing potential employees for a job. The job, such as a cook, may often involve listening to very fast, non-native English speakers, who do not use particularly difficult vocabulary. In such an example, the automatic speech recognizer 404 may include an acoustic model trained using non-native speakers. Further, the scoring model of the speech sample scoring engine 408 may be configured to highly value speech samples 402 having a high speaking rate, while penalizing samples that use difficult vocabulary. Using such logic, an examination or training materials can be tailored to the scenario at hand, to automatically identify appropriate speech samples with minimal human intervention.

Figure 5:
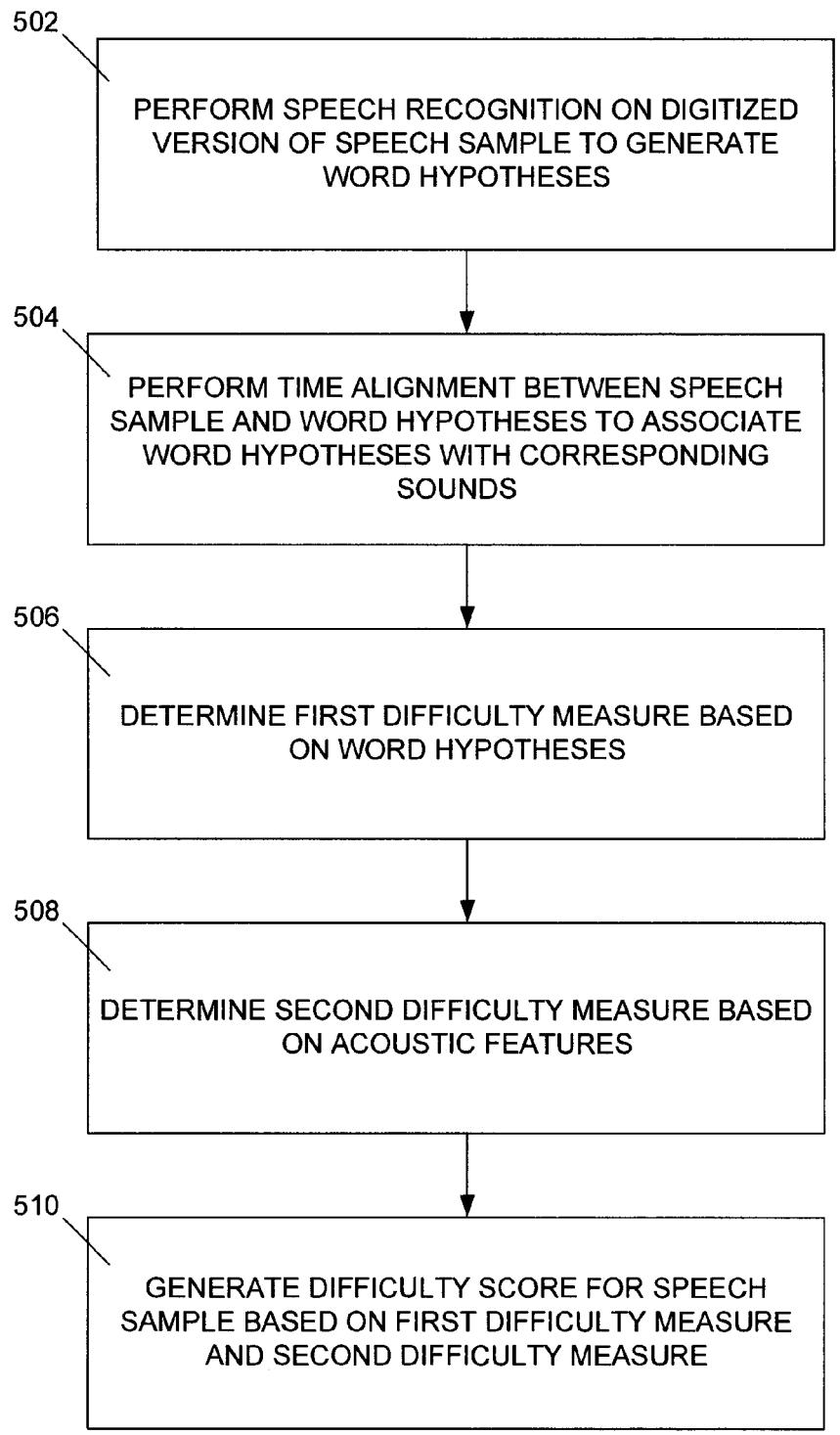
FIG. 5 is a flow diagram depicting a computer-implemented method of assigning a difficulty score to a speech sample.

FIG. 5 is a flow diagram depicting a computer-implemented method of assigning a difficulty score to a speech sample. Speech recognition is performed on a digitized version of the speech sample using an acoustic model to generate word hypotheses for the speech sample at 502. At 504, time alignment is performed between the speech sample and the word hypotheses to associate the word hypotheses with corresponding sounds of the speech sample. A first difficulty measure is determined at 506 based on the word hypotheses, and a second difficulty measure is determined at 508 based on acoustic features of the speech sample. A difficulty score for the speech sample is generated at 510 based on the first difficulty measure and the second difficulty measure.

Figure 6A:
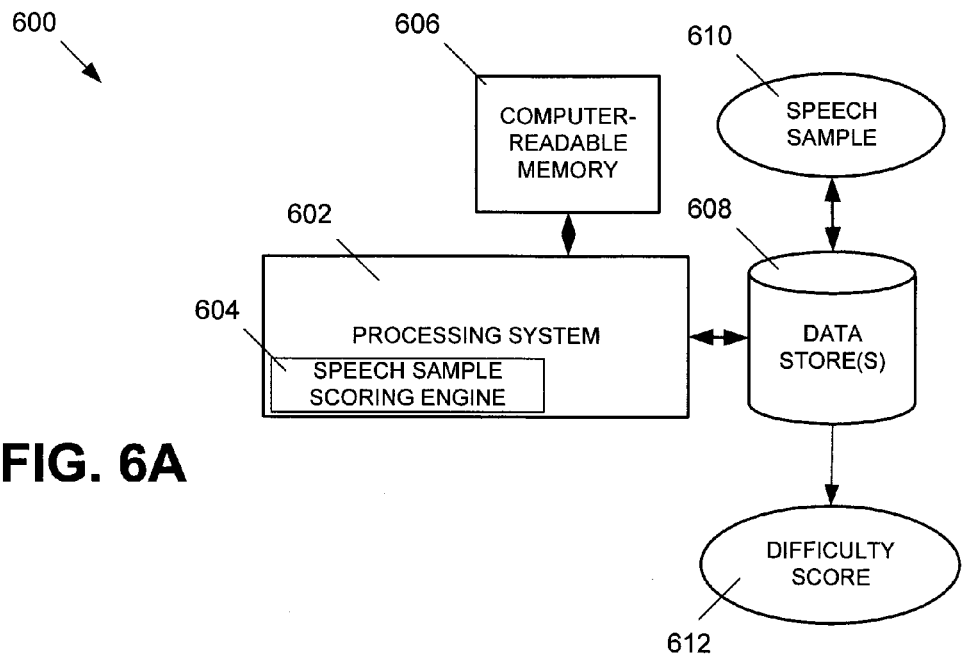
FIGS. 6A, 6B, and 6C depict example systems for use in implementing a speech sample scoring engine.
Figure 6B:
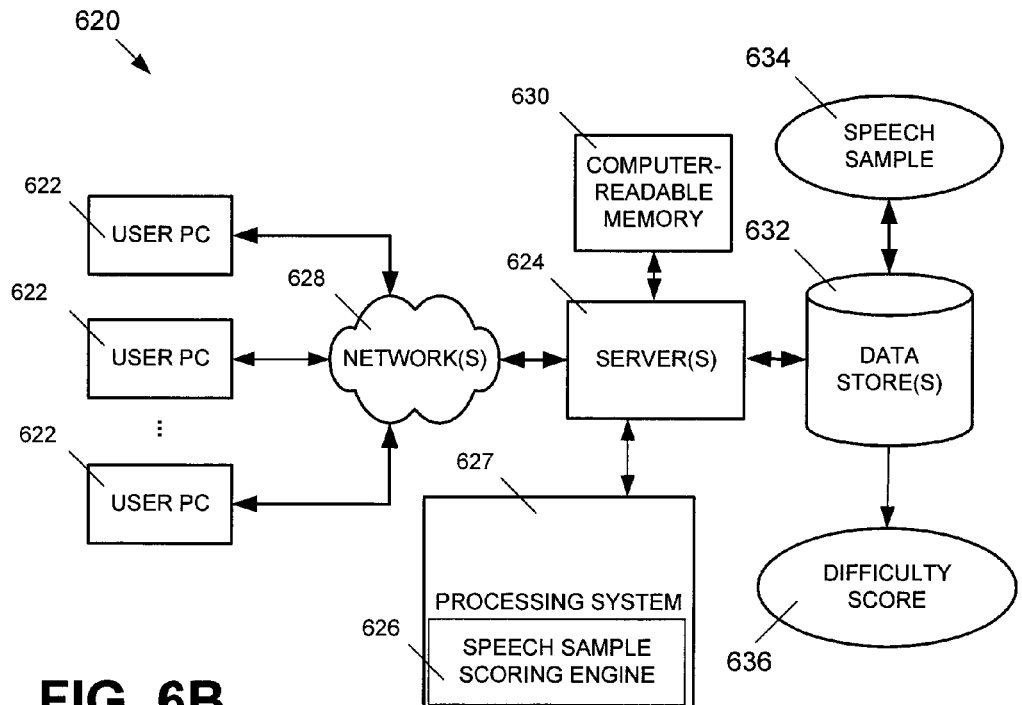
Figure 6C:
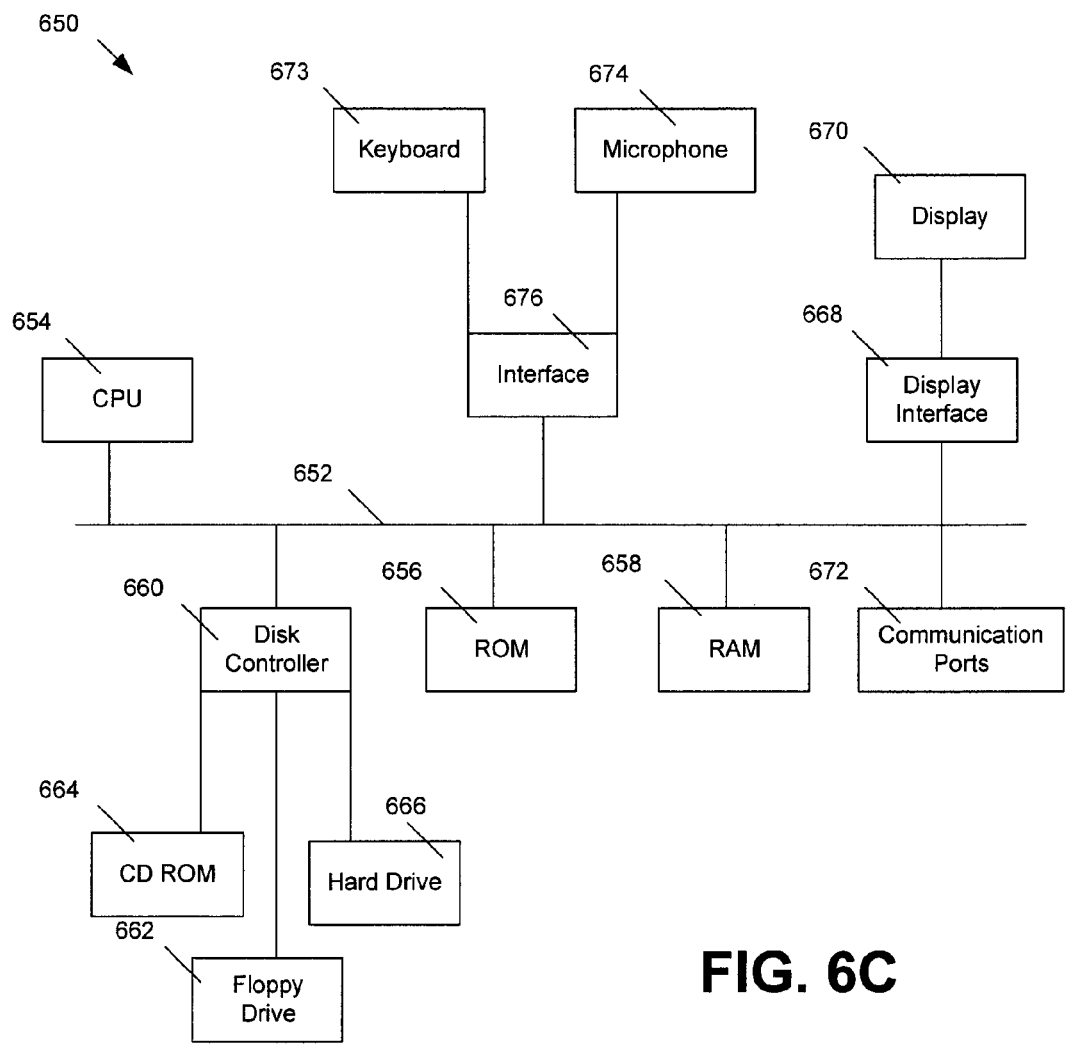

Examples have been used to describe the invention herein, and the scope of the invention may include other examples. FIGS. 6A, 6B, and 6C depict example systems for use in implementing a speech sample scoring engine. For example, FIG. 6A depicts an exemplary system 600 that includes a standalone computer architecture where a processing system 602 (e.g., one or more computer processors located in a given computer or in multiple computers that may be separate and distinct from one another) includes a part of speech sample scoring engine 604 being executed on it. The processing system 602 has access to a computer-readable memory 606 in addition to one or more data stores 608. The one or more data stores 608 may include speech samples 610 as well as difficulty scores 612.

FIG. 6B depicts a system 620 that includes a client server architecture. One or more user PCs 622 access one or more servers 624 running a part of speech sample scoring engine 626 on a processing system 627 via one or more networks 628. The one or more servers 624 may access a computer readable memory 630 as well as one or more data stores 632. The one or more data stores 632 may contain speech samples 634 as well as difficulty scores 636.

FIG. 6C shows a block diagram of exemplary hardware for a standalone computer architecture 650, such as the architecture depicted in FIG. 6A that may be used to contain and/or implement the program instructions of system embodiments of the present invention. A bus 652 may serve as the information highway interconnecting the other illustrated components of the hardware. A processing system 654 labeled CPU (central processing unit) (e.g., one or more computer processors at a given computer or at multiple computers), may perform calculations and logic operations required to execute a program. A non-transitory processor-readable storage medium, such as read only memory (ROM) 656 and random access memory (RAM) 658, may be in communication with the processing system 654 and may contain one or more programming instructions for performing the method of implementing a part of speech sample scoring engine. Optionally, program instructions may be stored on a non-transitory computer readable storage medium such as a magnetic disk, optical disk, recordable memory device, flash memory, or other physical storage medium.

A disk controller 660 interfaces one or more optional disk drives to the system bus 652. These disk drives may be external or internal floppy disk drives such as 662, external or internal CD-ROM, CD-R, CD-RW or DVD drives such as 664, or external or internal hard drives 666. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 660, the ROM 656 and/or the RAM 658. Preferably, the processor 654 may access each component as required.

A display interface 668 may permit information from the bus 652 to be displayed on a display 670 in audio, graphic, or alphanumeric format. Communication with external devices may optionally occur using various communication ports 672.

In addition to the standard computer-type components, the hardware may also include data input devices, such as a keyboard 673, or other input device 674, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of delivering a speech sample to an appropriate audience based on a difficulty level of the speech sample, comprising:
   retrieving the speech sample for evaluation from a non-transitory computer-readable memory;
   performing speech recognition of the speech sample using a processing system to generate word hypotheses for the speech sample, the speech recognition using an automatic speech recognizer configured using an acoustic model;
   performing, using the processing system, time alignment between the speech sample and the word hypotheses to associate the word hypotheses with corresponding sounds of the speech sample;
   determining, using a textual difficulty determination engine executed on the processing system, a first difficulty measure based on the word hypotheses for the speech sample, the first difficulty measure estimating a level of content difficulty of the speech sample;
   determining, using an acoustic difficulty determination engine executed on the processing system, a second difficulty measure based on only acoustic features of the speech sample;
   generating, using the processing system, a difficulty score associated with the speech sample by applying a scoring model to the first difficulty measure and the second difficulty measure;
   storing, using the processing system, the difficulty score associated with the speech sample in a non-transitory computer-readable memory;
   selecting, based on the difficulty score, the speech sample associated with the difficulty score for an appropriate audience; and
   outputting the selected speech sample to the appropriate audience.

2. The method of claim 1,
   further comprising:
   determining, using the processing system, a third difficulty measure based on both acoustic features of the speech sample and the word hypotheses for the speech sample;
   wherein said generating of the difficulty score further includes applying the scoring model to the third difficulty measure.

3. The method of claim 2, wherein the third difficulty measure is based on pronunciation quality in the speech sample.

4. The method of claim 2, further comprising:
   accessing an expected pronunciation for a word in the word hypotheses;
   comparing the expected pronunciation to sounds of the speech sample associated with the word;
   determining a pronunciation acoustic feature based on said comparing as the third difficulty measure.

5. The method of claim 1, wherein the second difficulty measure is based on prosody of the speech sample.

6. The method of claim 1, wherein the first difficulty measure is a vocabulary measure, a grammar measure, or a discourse measure.

7. The method of claim 1, wherein the second difficulty measure is a fluency measure based on the number of words spoken per second, a number of silences per word, a pause distribution, a speech chunk length, a speech chunk distribution, or a disfluency distribution.

8. The method of claim 1, wherein the second difficulty measure is a prosody measure based on a proportion of words starting with weak syllables over a total number of words, a mean distance between stressed syllables, an F0 range, an F0 slope, an F0 continuity, or an F0 variation.

9. The method of claim 1, wherein the first difficulty measure is a vocabulary measure based on a comparison of the word hypotheses with a word frequency table.

10. The method of claim 9, wherein the word frequency table identifies a frequency of use of different words in one or more reference speeches or texts.

11. The method of claim 1, further comprising:
    selecting the speech sample for inclusion on an examination based on the difficulty score.

12. The method of claim 1, further comprising:
    selecting the speech sample for use as a teaching aid based on the difficulty score.

13. The method of claim 1, wherein the difficulty score indicates an education grade level associated with the speech sample.

14. The method of claim 1, wherein the difficulty score is generated based on a speaking rate measure, a vocabulary difficulty measure, and a sentence length measure.

15. The method of claim 1, wherein the speech sample is a speech sample from a non-native English speaker.

16. The method of claim 15, wherein the automatic speech recognition is based on an acoustic model trained using non-native English speakers.

17. The method of claim 1, wherein the speech sample is a speech sample from a native English speaker.

18. The method of claim 17, wherein the automatic speech recognition is based on an acoustic model trained using native English speakers.

19. A computer-implemented method of delivering a speech sample to an appropriate audience based on a difficulty level of the speech sample, comprising:
retrieving the speech sample for evaluation from a non-transitory computer-readable memory, the speech sample includes speech by multiple speakers;
dividing the speech sample into multiple segments according to a speaker identity;
performing speech recognition of the speech sample using a processing system to generate word hypotheses for the speech sample, the speech recognition using an automatic speech recognizer configured using an acoustic model;
performing, using the processing system, time alignment between the speech sample and the word hypotheses to associate the word hypotheses with corresponding sounds of the speech sample;
determining, using a textual difficulty determination engine executed on the processing system, a first difficulty measure based on the word hypotheses for the speech sample, the first difficulty measure estimating a level of content difficulty of the speech sample;
determining, using an acoustic difficulty determination engine executed on the processing system, a second difficulty measure based on only acoustic features of the speech sample;
generating, using the processing system, a difficulty score associated with the speech sample by applying a scoring model to the first difficulty measure and the second difficulty measure;
wherein at least one difficulty measure is determined for each of the multiple segments;
wherein the difficulty score is generated based on the at least one difficulty measure determined for each of the multiple segments;
storing, using the processing system, the difficulty score associated with the speech sample in a non-transitory computer-readable memory;
selecting, based on the difficulty score, the speech sample associated with the difficulty score for an appropriate audience; and
outputting the selected speech sample to the appropriate audience.

20. The method of claim 19, wherein at least one difficulty measure is determined for an entirety of the speech sample; wherein the difficulty score is generated further based on the at least one difficulty measure that is determined for the entirety of the speech sample.

21. The method of claim 20, wherein a discourse measure is one of the at least one difficulty measure that is determined for the entirety of the speech sample.

22. A computer-implemented system for assigning delivering a speech sample to an appropriate audience based on a difficulty level of the speech sample, comprising:
a non-transitory computer-readable medium configured to store a digitized version of a speech sample;
an automatic speech recognizer configured to perform speech recognition on the digitized version of the speech sample using an acoustic model to generate word hypotheses for the speech sample and to perform time alignment between the speech sample and the word hypotheses to associate the word hypotheses with corresponding sounds of the speech sample;
a textual difficulty determination engine configured to determine a first difficulty measure based on the word hypotheses for the speech sample, the first difficulty measure estimating a level of content difficulty of the speech sample;
an acoustic difficulty determination engine configured to determine a second difficulty measure based on only acoustic features of the speech sample;
a difficulty score calculator configured to generate a difficulty score associated with the speech sample by applying a scoring model to the first difficulty measure and the second difficulty measure;
a computer-readable medium configured to store the difficulty score associated with the speech sample;
a selection module configured to select, based on the difficulty score, the speech sample associated with the difficulty score for an appropriate audience; and
an output device configured to output the selected speech sample to the appropriate audience.

* * * * *